(12) United States Patent
Skinner et al.

(10) Patent No.: US 10,694,145 B1
(45) Date of Patent: Jun. 23, 2020

(54) PRESENTING A PORTION OF A FIRST DISPLAY ON A SECOND DISPLAY POSITIONED RELATIVE TO THE FIRST DISPLAY

(71) Applicant: LENOVO (Singapore) PTE. LTD., New Tech Park (SG)

(72) Inventors: Jeffrey Earle Skinner, Raleigh, NC (US); Lincoln Penn Hancock, Raleigh, NC (US); Aaron M. Stewart, Raleigh, NC (US); Jonathan Jen-Wei Yu, Raleigh, NC (US); Alden Rose, Durham, NC (US)

(73) Assignee: Lenovo (Singapore) PTE LTD, New Tech Park (SG)

( * ) Notice: Subject to any disclaimer, the term of this patent is extended or adjusted under 35 U.S.C. 154(b) by 0 days.

(21) Appl. No.: 16/555,966

(22) Filed: Aug. 29, 2019

(51) Int. Cl.
| | |
|---|---|
| *H04N 7/14* | (2006.01) |
| *H04N 7/15* | (2006.01) |
| *G06F 3/14* | (2006.01) |
| *H04N 5/247* | (2006.01) |
| *H04N 5/262* | (2006.01) |

(52) U.S. Cl.
CPC ........... *H04N 7/144* (2013.01); *G06F 3/1423* (2013.01); *H04N 5/247* (2013.01); *H04N 5/2628* (2013.01); *H04N 7/15* (2013.01)

(58) Field of Classification Search
CPC ........................................................ H04N 7/14
See application file for complete search history.

(56) References Cited

U.S. PATENT DOCUMENTS

| | | | | |
|---|---|---|---|---|
| 2012/0280924 | A1* | 11/2012 | Kummer | H04M 1/0235 345/173 |
| 2014/0365957 | A1* | 12/2014 | Louch | G06F 3/1431 715/790 |
| 2017/0192733 | A1* | 7/2017 | Huang | G06F 3/1446 |

\* cited by examiner

*Primary Examiner* — Olisa Anwah
(74) *Attorney, Agent, or Firm* — Kunzler Bean & Adamson (57) ABSTRACT

Apparatuses, methods, systems, and program products are disclosed for presenting a portion of a first display on a second display positioned relative to the first display. An apparatus includes an information handling device that includes a processor, a display that is communicatively coupled to the processor, and a memory that stores code executable by the processor. The code is executable to determine a position of the information handling device relative to a display that is external to the information handling device, determine at least a portion of information presented on the external display that corresponds to the position of the information handling device, and present, on the display of the information handling device, the determined at least a portion of the external display.

20 Claims, 8 Drawing Sheets

PRESENTING A PORTION OF A FIRST DISPLAY ON A SECOND DISPLAY POSITIONED RELATIVE TO THE FIRST DISPLAY

FIELD

The subject matter disclosed herein relates to display devices and more particularly relates to presenting a portion of a first display on a second display positioned relative to the first display.

BACKGROUND

Eye contact during face-to-face conversations is an important component of human communication. People rely on visual cues, both subtle and overt, when talking with another person. Video-calling and video-conferencing technologies strive to offer approximations of face-to-face conversations. However, the experience of video-calling using existing solutions can be disorienting and awkward, especially on larger displays. Because the camera and the display are not located along the same line of sight, it is difficult to know where a remote participant's attention or gaze is directed during a video call.

BRIEF SUMMARY

Apparatuses, methods, systems, and program products are disclosed for presenting a portion of a first display on a second display positioned relative to the first display. An apparatus includes an information handling device that includes a processor, a display that is communicatively coupled to the processor, and a memory that stores code executable by the processor. In one embodiment, code is executable by the processor to determine a position of the information handling device relative to a display that is external to the information handling device, determine at least a portion of information presented on the external display that corresponds to the position of the information handling device, and present, on the display of the information handling device, the determined at least a portion of the external display.

A method for presenting a portion of a first display on a second display positioned relative to the first display includes determining, by use of a processor, a position of an information handling device relative to a display that is external to the information handling device, determining at least a portion of information presented on the external display that corresponds to the position of the information handling device, and presenting, on the display of the information handling device, the determined at least a portion of the external display.

A program product for presenting a portion of a first display on a second display positioned relative to the first display includes a computer readable storage medium that stores code executable by a processor. In one embodiment, code is executable by the processor to determine a position of the information handling device relative to a display that is external to the information handling device, determine at least a portion of information presented on the external display that corresponds to the position of the information handling device, and present, on the display of the information handling device, the determined at least a portion of the external display.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

An apparatus includes an information handling device that includes a processor, a display that is communicatively coupled to the processor, and a memory that stores code executable by the processor. In one embodiment, code is executable by the processor to determine a position of the information handling device relative to a display that is external to the information handling device, determine at least a portion of information presented on the external display that corresponds to the position of the information handling device, and present, on the display of the information handling device, the determined at least a portion of the external display.

In one embodiment, the information handling device further comprises a first camera communicatively coupled to the processor. The first camera faces the external display such that the determined at least a portion of the information presented on the external display comprises information captured within a field of view of the camera. In certain embodiments, the code is executable by the processor to scale the determined at least a portion of the information captured within the field of view of the camera based on the determined position of the information handling device relative to the external display and based on dimensions of the information handling device such that the scaled at least a portion of the information corresponds to a portion of the external display that is obscured by the information handling device.

In one embodiment, the scaling of the determined at least a portion of the information captured within the field of view of the camera is further determined according to dimensions of the display of the information handling device and the bezel around the display of the information handling device. In some embodiments, the position of the information handling device relative to the external display is determined based on one or more images of the external display that are captured using the first camera of the information handling device.

In further embodiments, the code is executable by the processor to receive, from a computing device coupled to the external display, data describing graphical information presented on the external display. In one embodiment, the code is executable by the processor to generate a graphical representation of the external display using the graphical information and present the graphical representation of the external display in an augmented reality environment such that the determined at least a portion of the external display that is presented on the display of the information handling device within the augmented reality environment comprises a portion of the graphical representation of the external display that is obscured by the information handling device.

In one embodiment, the information handling device comprises one or more sensors communicatively coupled to the processor. The one or more sensors may be used to capture information for determining the position of the information handling device relative to the external display. In certain embodiments, the code is executable by the processor to calibrate an initial position of the information handling device relative to the external display using the one or more sensors.

In one embodiment, the information handling device further comprises a second camera communicatively coupled to the processor. The second camera faces away from the external display such that information that is captured using the second camera is transmitted to a computing device coupled to the external display. In various embodiments, the information presented on the external display comprises graphical information for a video conferencing application and the second camera of the information handling device is used as a webcam by the video conferencing application.

In certain embodiments, the code is executable by the processor to dynamically update the determined at least a portion of information presented on the external display that corresponds to the position of the information handling device in response to detecting a change in the position of the information handling device relative to the external display. In one embodiment, the determined at least a portion of information presented on the external display that corresponds to the position of the information handling device is updated in response to determining that the position of the information handling device is changed by a threshold amount.

A method for presenting a portion of a first display on a second display positioned relative to the first display includes determining, by use of a processor, a position of an information handling device relative to a display that is external to the information handling device, determining at least a portion of information presented on the external display that corresponds to the position of the information handling device, and presenting, on the display of the information handling device, the determined at least a portion of the external display.

In one embodiment, the information handling device comprises a first camera communicatively coupled to the processor. The first camera faces the external display such that the determined at least a portion of the information presented on the external display comprises information captured within a field of view of the camera. In certain embodiments, the method includes scaling the determined at least a portion of the information captured within the field of view of the camera based on the determined position of the information handling device relative to the external display and based on dimensions of the information handling device such that the scaled at least a portion of the information corresponds to a portion of the external display that is obscured by the information handling device.

In one embodiment, the method includes scaling the determined at least a portion of the information captured within the field of view of the camera based on the determined position of the information handling device relative to the external display and based on dimensions of the information handling device such that the scaled at least a portion of the information corresponds to a portion of the external display that is obscured by the information handling device. In one embodiment, the method includes receiving, from a computing device coupled to the external display, data describing graphical information presented on the external display.

In certain embodiments, the method includes generating a graphical representation of the external display using the graphical information and presenting the graphical representation of the external display in an augmented reality environment such that the determined at least a portion of the external display that is presented on the display of the information handling device within the augmented reality environment comprises a portion of the graphical representation of the external display that is obscured by the information handling device. In one embodiment, the method includes calibrating an initial position of the information handling device relative to the external display using the one or more sensors.

A program product for presenting a portion of a first display on a second display positioned relative to the first display includes a computer readable storage medium that stores code executable by a processor. In one embodiment, code is executable by the processor to determine a position of the information handling device relative to a display that is external to the information handling device, determine at least a portion of information presented on the external display that corresponds to the position of the information handling device, and present, on the display of the information handling device, the determined at least a portion of the external display.

Figure 1:
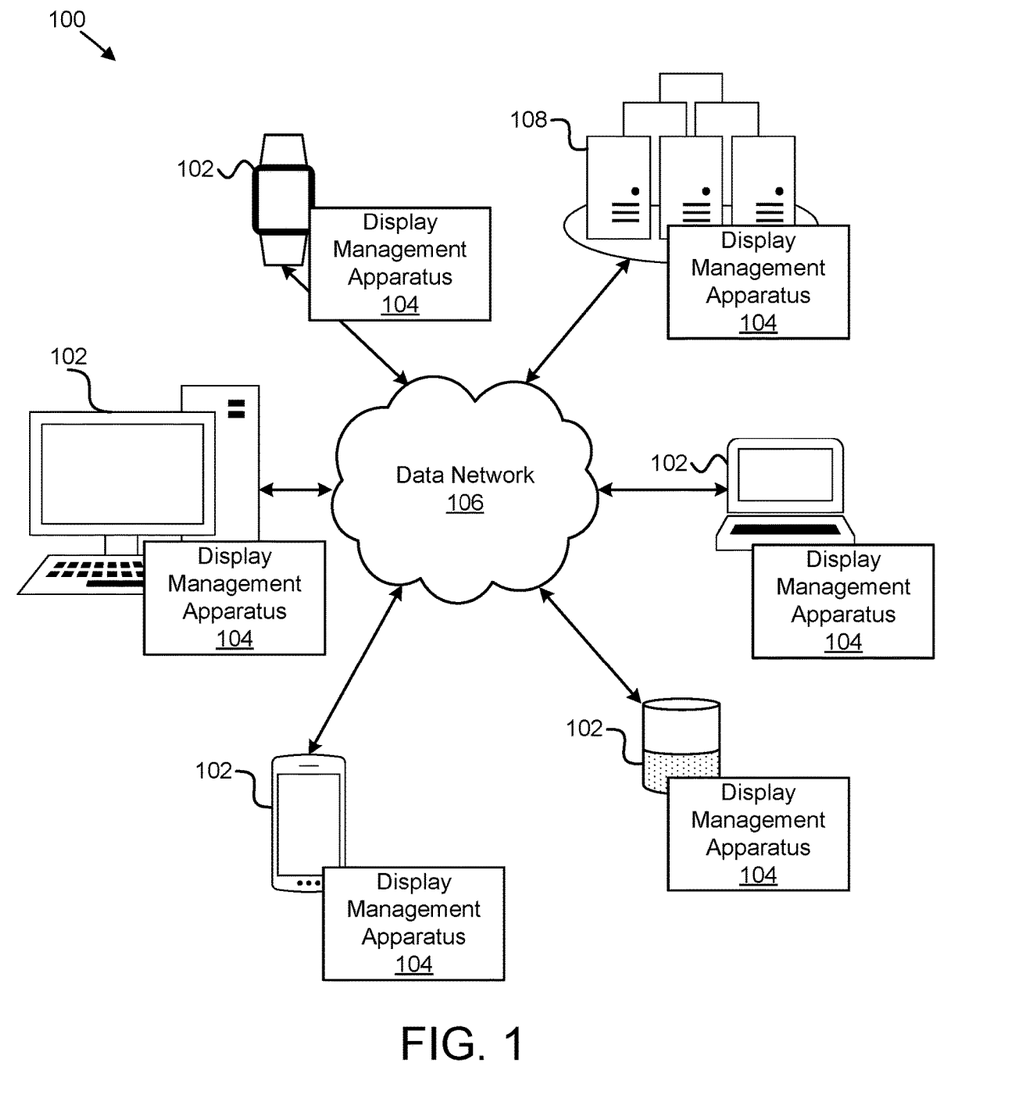
FIG. 1 is a schematic block diagram illustrating one embodiment of a system for presenting a portion of a first display on a second display positioned relative to the first display.

FIG. 1 is a schematic block diagram illustrating one embodiment of a system 100 for presenting a portion of a first display on a second display positioned relative to the first display. In one embodiment, the system 100 includes one or more information handling devices 102, one or more display management apparatuses 104, one or more data networks 106, and one or more servers 108. In certain embodiments, even though a specific number of information handling devices 102, display management apparatuses 104, data networks 106, and servers 108 are depicted in FIG. 1, one of skill in the art will recognize, in light of this disclosure, that any number of information handling devices 102, display management apparatuses 104, data networks 106, and servers 108 may be included in the system 100.

In one embodiment, the system 100 includes one or more information handling devices 102. The information handling devices 102 may include one or more of a desktop computer, a laptop computer, a tablet computer, a smart phone, a smart speaker (e.g., Amazon Echo®, Google Home®, Apple HomePod®), an Internet of Things device, a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium, a display, a connection to a display, and/or the like.

In certain embodiments, the information handling devices 102 are communicatively coupled to one or more other information handling devices 102 and/or to one or more servers 108 over a data network 106, described below. The information handling devices 102, in a further embodiment, may include processors, processor cores, and/or the like that are configured to execute various programs, program code, applications, instructions, functions, and/or the like. The information handling devices 102 may include various sensors for sensing, collecting, monitoring, or the like data such as motion data, proximity data, and/or the like. The sensors may include location sensors (e.g., global positioning system ("GPS") sensors), proximity sensors, wireless signal sensors (e.g., sensors configured to sense wireless signals emitted from other devices such as Bluetooth® signals, Wi-Fi signals, near field communication ("NFC") signals, and/or the like), accelerometers, gyroscopes, light sensors, sound sensors, biometric sensors (e.g., blood pressure sensors, heart-rate monitors, fingerprint sensors, oxygen sensors, and/or the like), and/or the like.

In one embodiment, the display management apparatus 104 is configured to determine a position of an information handling device 102 relative to a display that is external to the information handling device 102, determine at least a portion of information presented on the external display that corresponds to the position of the information handling device 102, and present the determined at least a portion of the external display on the display of the information handling device 102.

For example, during a video call, a user typically uses a webcam that is mounted on top of the display to capture video of the user for the call. In such a setup, the user is likely looking directly at the display, which presents a video feed of the other party of the call and is not located along the same plane/vector/line of sight as the user's eyes. Because the camera and the display are not located along the same line of sight, it is difficult for the other party to know with a surety where the user's attention or gaze is directed during a video call. The difference between the vector of a participant's gaze and the vector of the camera's field of view produces odd sensations on both ends of a video call—remote participants always appear to be looking up, down, or away at something else (when that "something else" actually may be her own representation, appearing on a screen off-axis with the "eyes" of the caller's camera). The same undesirable sensation is also present with current smartphones, which use notches, slots and holes in their displays to minimize the need for large bezels. Even with front-facing cameras better situated within the screen's bounds, the desired eye-level alignment is difficult to attain.

The display management apparatus 104 improves eye contact during video calls on external displays by enabling a smartphone to be used as webcam. It allows for placement of a camera in the user's natural line of sight, adjacent to the onscreen representation of the remote caller, with minimal distraction. The display management apparatus 104, in certain embodiments, shows the portion of an external display that is obscured by the body of the user's mobile device on the display of the mobile device such that the mobile device effectively "disappears" into the background of the external display behind the mobile device. The user may then hold the mobile device (or place it on a stand, mount, ledge, or the like) in her line of sight, adjacent to the image of the remote caller during a video call. The display management apparatus 104, including its various sub-modules, may be located on one or more information handling devices 102 in the system 100, one or more servers 108, one or more network devices, and/or the like. The display management apparatus 104 is described in more detail below with reference to FIGS. 2 and 3.

In various embodiments, the display management apparatus 104 may be embodied as a hardware appliance that can be installed or deployed on an information handling device 102, on a server 108, on a user's mobile device, on a display, or elsewhere on the data network 106. In certain embodiments, the display management apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the display management apparatus 104 may include a power interface, a wired and/or wireless network interface, a graphical interface that attaches to a display, and/or a semiconductor integrated circuit device as described below, configured to perform the functions described herein with regard to the display management apparatus 104.

The display management apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the display management apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the display management apparatus 104.

The semiconductor integrated circuit device or other hardware appliance of the display management apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the display management apparatus 104 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102. The servers 108 may comprise back-end servers for facilitating video calling and/or video conferencing services between a plurality of users.

Figure 2:
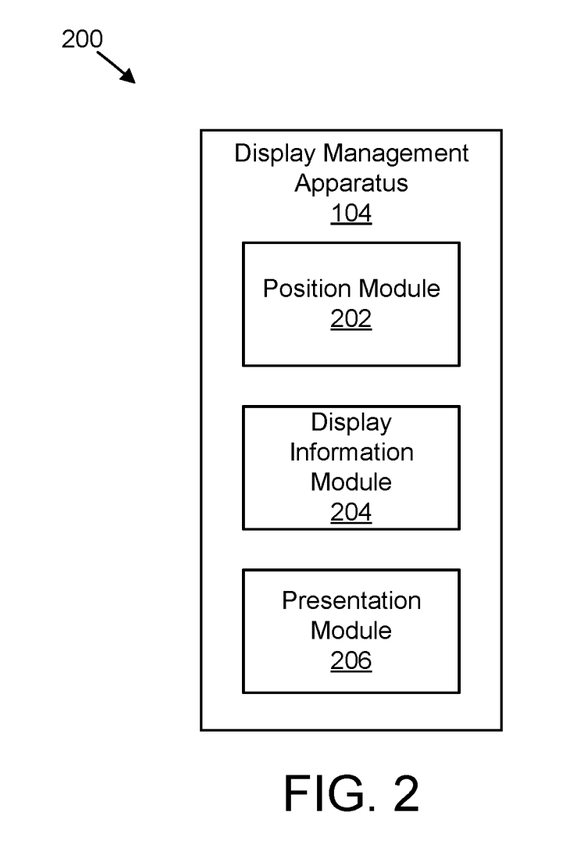
FIG. 2 is a schematic block diagram illustrating one embodiment of an apparatus for presenting a portion of a first display on a second display positioned relative to the first display.

FIG. 2 is a schematic block diagram illustrating one embodiment of an apparatus 200 for presenting a portion of a first display on a second display positioned relative to the first display. In one embodiment, the apparatus 200 includes an embodiment of a display management apparatus 104. The display management apparatus 104 includes one or more of a position module 202, a display information module 204, and a presentation module 206, which are described in more detail below.

The position module 202, in one embodiment, is configured to determine a position of an information handling device 102 relative to a display that is external to the information handling device 102. In one embodiment, the information handling device 102 comprises a mobile device, e.g., a smart phone, that is positioned in front of a larger external display such as a computer monitor, laptop display, projector screen, and/or the like. The position module 202 may determine the position of the information handling device 102 within a three-dimensional space relative to the external display.

For instance, the position module 202 may determine the vertical position of the information handling device 102 relative to the bottom of the external display (e.g., the bottom bezel of the display), relative to the top of a desk or table that the external display is sitting on, relative to a top of the external display (e.g., the top bezel of the display), and/or the like. The position module 202 may also determine the horizontal position of the information handling device 102 relative to a length of the external display, e.g., relative to a left or right side of the display such as the left and right bezels of the display. The position module 202 may also determine a distance of the information handling device 102 from the surface of the external display (e.g., the information handling device's position along the z-coordinate plane).

The position module 202 may define the position of the information handling device 102 within a three-dimensional space by using (x,y,z) coordinates to define the positions of various portions of the information handling device 102 within the three-dimensional space such as the corners of the information handling device 102, the edges of the information handling device 102, and so on. The coordinates that define the information handling device's position within the three-dimensional space may be mapped onto the external display to determine the portion of the external display that is obscured or blocked by the information handling device 102. In other words, the bounds of the external display may be defined in a two- or three-dimensional space, and the coordinates that define the position of the information handling device 102 within the three-dimensional space may be mapped onto the corresponding coordinates of the external display, and scaled based on the z-position of the information handling device 102, to determine the portion of the external display that is obscured by the information handling device 102.

In one embodiment, the position module 202 uses data that is captured using one or more sensors of the information handling device 102 to determine the information handling device's position relative to the external display. For instance, the position module 202 may use data captured using proximity sensors, motion sensors, infrared sensors, light sensors, accelerometers, gyroscopes, and/or the like of the information handling device 102 to determine a location of the information handling device relative to external objects such as the external display, a desk- or table-top, the user, and/or other objects. The position module 202 may use the sensor data in various positioning algorithms or calculations to determine or estimate the position of the information handling device 102 relative to the external display.

Figure 3:
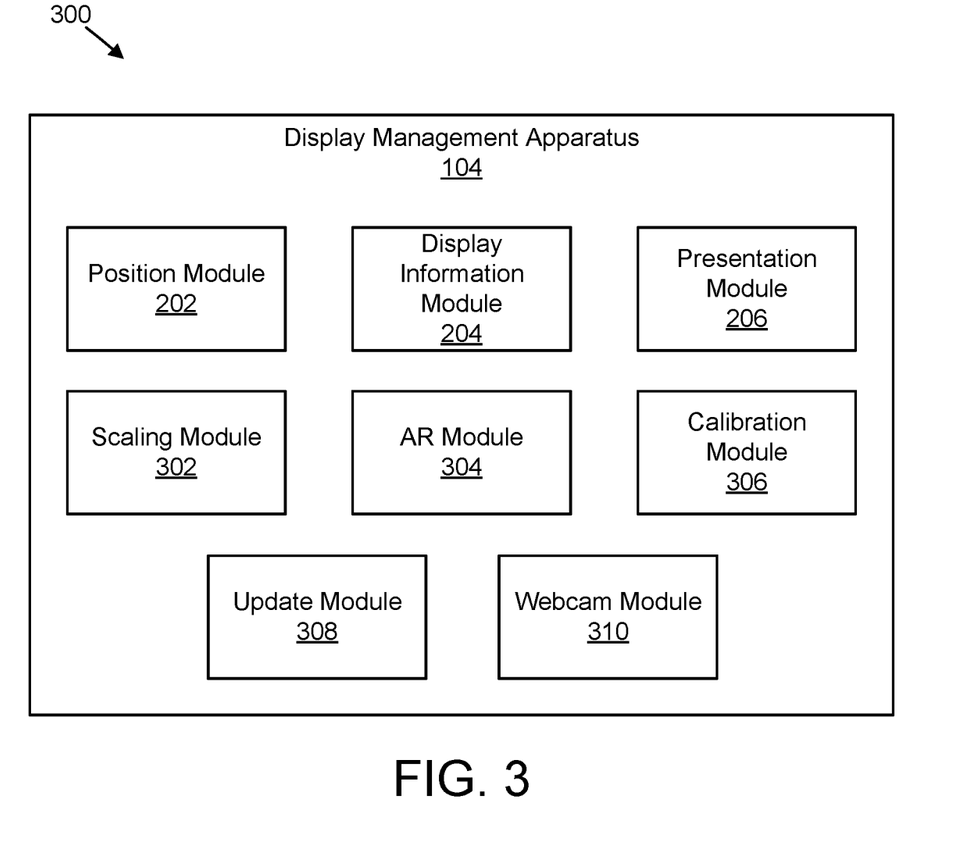
FIG. 3 is a schematic block diagram illustrating one embodiment of another apparatus for presenting a portion of a first display on a second display positioned relative to the first display.

In addition, or alternatively, the position module 202 may determine the position of the information handling device 102 based on one or more images of the external display that are captured using a camera of the information handling device 102, such as a rear-facing camera of a smart phone (e.g., the camera that is located on the back side of the smart phone opposite the side of the smart phone that houses the display). The position module 202, for instance, may capture images or video of the external display using the camera and perform various image processing calculations, processes, actions, algorithms, or the like to determine the position of the information handling device 102 relative to the external display. For example, the position module 202 may use the camera settings and/or specifications such as the sensor size, the focal length of the lens, the size of the external display, In some embodiments, the position module 202 determines the position of the information handling device 102 based on or as a function of a baseline position, a calibrated position, an initial position, a predetermined position, and/or the like for the information handling device 102, as described in more detail below with reference to the calibration module 306.

The display information module 204, in one embodiment, is configured to determine at least a portion of information or data presented on the external display that corresponds to the position of the information handling device 102. The information may comprise graphical information or data such as text, images, graphics, videos, animations, web pages, and/or the like that is being presented on the external display.

In one embodiment, the display information module 204 uses a camera of the information handling device 102 that is facing the external display, e.g., the rear-facing camera of a smart phone, to capture one or more images or videos of the external display, which are then used to determine data that is presented on the display (e.g., similar to a screenshot of the display). The display information module 204 may take images periodically, when the information handling device 102 is moving, when changes on the external display are detected, and/or the like. The display information module 204 may determine the portion of the display that is within the field of view of the camera, based on the images that the camera captures and based on the position of the information handling device 102, and may scale the images (as described below with reference to the scaling module 302) to determine what portion of the images correspond to the portion of the external display that is obscured by the information handling device 102.

In one embodiment, the display information module 204 uses a front-facing camera of the information handling device 102, e.g., a camera that faces away from the display, to determine the user's position in relation to the information handling device 102. More specifically, the display information module 204 may capture one or images/videos of the user using the front-facing camera to determine the user's position relative to the information handling device 102, the user's face, the user's eye gaze, and/or the like.

The display information module 204, for instance, may use image processing algorithms or methods to track the user's head location, face, eye gaze, or the like to determine the viewing angle and/or distance of the user relative to the information handling device 102, which determines what portion of the images of the external display that are captured using the rear-facing camera should be presented on the display of the information handling device 102. In other words, in certain embodiments, the display information module 204 needs to know not only where the information handling device 102 is relative to the external display, but the angle and/or distance from which the information handling device 102 is being viewed in the three-dimensional space between the user and the external display (which may be determined dynamically using data from various sensors (e.g., proximity sensors) and images that are captured using the front-facing camera.

In further embodiments, the display information module 204 receives, from a computing device coupled to the external display, data describing graphical information presented on the external display. In such an embodiment, the information handling device 204 may be communicatively coupled to the external display using a wired or wireless connection, and the display information module 204 may receive information or data that describes what is presented on the external display.

The information that the display information module 204 receives may include the same data that the external display receives from the computing device, which may include graphical information such as pixel data that is used to render graphics on the external display. In other words, the computing device may send the same graphics information to both the external display and the information handling device 102. Based on the graphical information that the display information module 204 receives, the display information module 204 then determines what portion of the graphical information corresponds to the position of the information handling device 102 to determine what portion of the external display is obscured by the information handling device 102.

For example, the display information module 204 may use the dimensions of the information handling device 102 and the position of the information handling device 102 in relation to the external display to determine what portion of the external display is obscured by the information handling device 102, and then may determine the portion of the graphical information that corresponds to the portion of the external display that is obscured by the information handling device 102 to present on the display of the information handling device 102.

The presentation module 206, in one embodiment, is configured to present, on the display of the information handling device 102, the determined at least a portion of the external display. The presentation module 206, in one embodiment, may present the at least a portion of the external display in an application such as a video calling application, an augmented reality application (see below), an image viewer application, and/or the like application that is configured to present data in the format that the graphical information is provided. For instance, if the graphical information comprises image data (e.g., pixel data), an image viewer application may be used to display the information. In other embodiments, an augmented reality application may be used if the graphical data is formatted for an augmented reality application so that as the user moves the information handling device 102 around, a virtual representation of the external display is visible on the information handling device's display.

FIG. 3 is a schematic block diagram illustrating one embodiment of another apparatus 300 for presenting a portion of a first display on a second display positioned relative to the first display. In one embodiment, the apparatus 300 includes an instance of a display management module 104. The display management module 104, in one embodiment, includes one or more of a scaling module 302, an AR module 304, a calibration module 306, an update module 308, and a webcam module 310, which are described in more detail below.

The scaling module 302, in one embodiment, is configured to scale the determined at least a portion of the information that represents the information that is presented on the portion of the external display that is obscured by the information handling device 102. In one embodiment, where the graphical information comprises one or more images that are captured using the rear-facing camera of the information handling device 102, the scaling module 302 scales the graphical information that is within the field of view of the camera based on the determined position of the information handling device 102 relative to the external display.

For instance, the rear-facing camera, or each of multiple rear-facing cameras, may comprise a wide-angle lens or may otherwise have a larger field of view than the portion of the external display that is obscured by the information handling device 102. In such an embodiment, the scaling module 302 may use the position of the information handling device 102 relative to the external display to determine what portion of the graphical information within the captured images is obscured by the information handling device 102 and scale the graphical information to the portion of the external display that is obscured by the information handling device 102 so that only the scaled portion of the graphical information is presented on the display of the information handling device 102.

Furthermore, the scaling module 302 may determine the dimensions of the information handling device 102, e.g., the length and the width, and use the dimensions to calculate the scaling factor for the portion of the graphical information that is obscured by the information handling device 102. For example, the scaling module 302 may take the determined position of the information handling device 102 relative to the external display, determine the field of view, e.g., viewing angle, of the camera based on the camera lens, and based on the dimensions of the information handling device 102 determine what portion of the captured images corresponds to the portion of the external display that is obscured by the information handling device 102 and only provide the scaled portion of the captured images to the presentation module 206 for presentation on the display of the information handling device 102.

The scaling module 302, in another example, may determine the x,y coordinates for each corner of the information handling device 102, or multiple x,y coordinates that define the edges of the information handling device 102 and determine the corresponding portion of the external display that corresponds to the determined coordinates (based on the position of the information handling device 102) and then use the determined x,y coordinates, the position of the information handling device 102 in the z-coordinate plane (e.g., the distance from the external display), and the field of view of the camera to scale the captured images to the portion of the external display that is obscured by the information handling device 102.

In certain embodiments, the scaling module 302 further refines the scaling of the graphical information that is presented on the display of the information handling device 102 by determining the dimensions and coordinates of the display of the information handling device 102 and/or the dimensions and coordinates of the bezel around the display of the information handling device 102. For instance, the scaling module 302 may further scale the portion of the external display that is obscured by the information handling device by the size of the bezel and/or the size of the display (which may be defined by the specifications of the information handling device 102) to more accurately represent the portion of the external display that is obscured by the information handling device 102. In this manner, with the correct scaling factor, the information handling device 102 can be used as a "looking-glass" through which the portion of the external display that is behind the information handling device 102 is accurately represented on the display of the information handling device 102.

The AR module 304, in one embodiment, is configured to generate a graphical representation of the external display using the graphical information and present the graphical representation of the external display in an augmented reality or virtual reality environment. As used herein, virtual reality refers to the computer-generated simulation of a three-dimensional image or environment that can be interacted with in a seemingly real or physical way by a person. Augmented reality, as used herein, refers to technology that superimposes a computer-generated image on a user's view of the real world, thus providing a composite view.

Thus, the AR module 304 may generate or present a virtual or real-world representation of the external display, e.g., based on images of the external display, based on user-defined or pre-defined specifications of the external display, and/or the like and may use the graphical information that is received from the computing device that is connected to the external display to overlay, superimpose, or the like on the virtual or real-world representation of the external display.

Accordingly, the AR module 304 may determine what portion of the graphical information that is presented on the external display is obscured by the information handling device 102, as described above with reference to the position module 202, the display information module 204, and the scaling module 302, and may present the determined portion of the graphical information of the external display that is obscured by the information handling device 102 within the AR environment on the display of the information handling device 102.

The calibration module 306, in one embodiment, is configured to determine, calibrate, set, calculate, and/or the like an initial position of the information handling device 102 relative to the external display using one or more sensors of the information handling device 102. As described above, the one or more sensors may include proximity sensors, light sensors, motion sensors, infrared sensors, wireless signal sensors, accelerometers, gyroscopes, cameras, and/or the like.

The calibration module 306, in one embodiment, may capture information using the one or more sensors in response to the user running or executing a program that includes the display management module 104 to dynamically determine the initial position of the information handling device 102. For example, the user may execute a video call application on a computing device that is connected to the external display and also connected to the user's mobile device 102. In response to the video call application being executed, the calibration module 306 may trigger or activate one or more sensors to capture sensor data that can be used to determine the instant, baseline, default, or initial position of the information handling device 102 relative to the external display, as explained above with reference to the position module 202.

In further embodiments, the calibration module 306 may instruct or prompt the user to place the user's information handling device 102 at a predefined location relative to the external display for calibrating the location of the information handling device 102. For example, the calibration module 306 may instruct the user to place the user's smart phone against the top left or right corners of the external display, against the center of the external display, against a bottom left or right corners of the external display, and/or the like.

In such an embodiment, the calibration module 306 may prompt the user to confirm when the information handling device 102 is at the instructed location so that it can trigger the sensors to begin capturing sensor data. When positioned at the initial position, the calibration module 306 can generate a baseline of sensor data and the position module 202 may compare the baseline sensor data to future sensor data to determine and track the information handling device's position in relation to the external display.

The update module 308, in one embodiment, is configured to dynamically update the determined at least a portion of information presented on the external display that corresponds to the position of the information handling device 102 in response to detecting a change in the position of the information handling device relative to the external display. For example, in response to detecting that the information handling device 102 has moved to a new position, the update module 308 may signal, trigger, notify, or the like the position module 202 to determine the new position of the information handling device 102 and the display information module 204 to determine the portion of the external display that corresponds to the new position of the information handling device 102.

In certain embodiments, the update module 308 updates the information handling device 102 with the portion of information that is presented on the external display that corresponds to the position of the information handling device 102 in response to determining that the position of the information handling device 102 is changed by a threshold amount. For instance, if the user has shaky hands while holding the information handling device 102, based on the position module 202, such that the slight movements of the user's hands are below a threshold movement amount, then the update module 308 may not consider the information handling device 102 to be at a new location and may not trigger an update of the information that is presented on the information handling device 102.

On the other hand, if the user moves the information handling device 102 from one side of the external display to the other side (e.g., from left to right), based on the position module 202, such that the movement is greater than the threshold movement amount, the update module 308 may consider the information handling device 102 to be at a new location and may trigger an update of the information that is presented on the information handling device 102.

Similarly, if the update module 308 detects that the graphical display for the external device has changed, e.g., if the image changed or the like beyond a threshold amount (e.g., if a number of pixels that changed within the portion of external display that is presented on the information handling device is greater than a threshold amount), the update module 308 may trigger the display information module 204 to update the graphical information presented on the information handling device 102.

In certain embodiments, the update module 308 triggers a refresh of the display of the information handling device 102 according to a refresh rate. The refresh rate may be twenty times per second, thirty times per second, sixty times per second, or the like. When a refresh is triggered, the update module 308 triggers the position module 202 and the display information module 204 to update their information regarding the portion of the external display that is obscured by the information handling device 102 and which should be presented on the display of the information handling device 102.

In one embodiment, the webcam module 310 is configured to capture images or videos of the user of the information handling device 102 using a front-facing camera, e.g., the camera facing the user, which is used as a webcam to capture images/videos of the user and transmit the images/videos to the computing device that is coupled to the external display for transmission to other users as part of a video call application. In this manner, the user's information handling device 102 can be seamlessly used as a webcam positioned directly in the line of sight of the user and as a secondary display for a video call or video conferencing session to correct the shortcomings of using a webcam that is located around the external display instead of directly in front of the external display.

Figure 4:
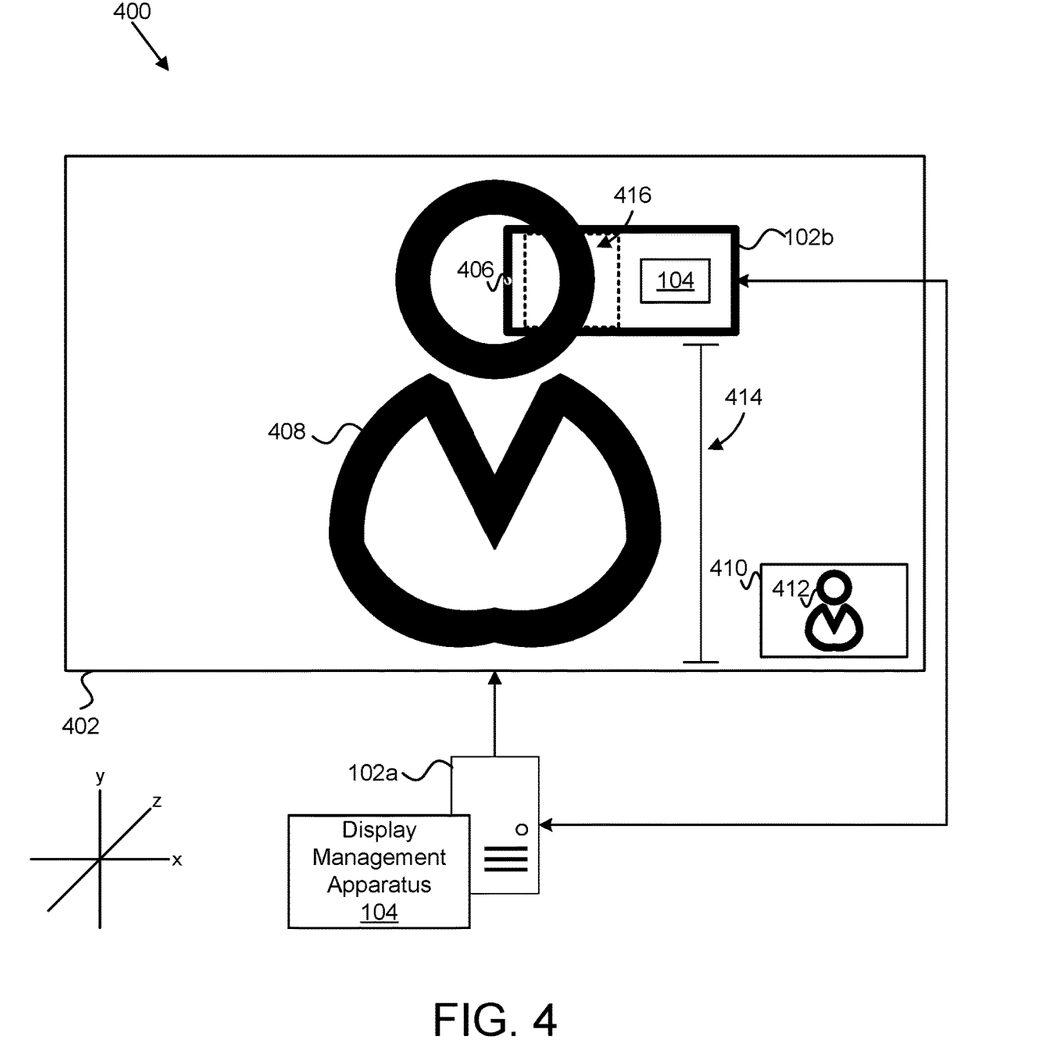
FIG. 4 is a schematic block diagram illustrating one embodiment of an example system for presenting a portion of a first display on a second display positioned relative to the first display.

FIG. 4 is a schematic block diagram illustrating one embodiment of an example system 400 for presenting a portion of a first display on a second display positioned relative to the first display. In one embodiment, the system 400 includes an external display 402, e.g., a laptop or desktop monitor that is connected to a computing device 102a. In further embodiments, the system 400 includes a user's mobile device 102b such as a smart phone that includes a front-facing camera 406. In certain embodiments, each of the computing device 102a, the external monitor 402, and/or the information handling device 102b includes an instance of a display management apparatus 104.

In one embodiment, a video call may be ongoing between a remote user 408 and the user 412 associated with the mobile device 102b. During the video call, the mobile device 102b may be communicatively coupled to the computing device 102a to receive information regarding the data that is presented on the external display 402. Furthermore, during the video call, the mobile device 102b may be used as a webcam, using the front-facing camera 406 to capture the user's 412 direct line of sight. The user's image may be presented on the external display 410 alongside the remote user 408.

However, in such an embodiment, a portion of the external display 402 may be obscured by the mobile device 102b. Accordingly, the display management apparatus 102 determines the portion of the external display 402 that is obscured by the mobile device 102b and presents the obscured portion of the external display 402 on the information handling device 102b.

As described above, the position module 202 determines the position of the mobile device 102b, e.g., based on the distance 414 to the bottom and/or top of the display 402, to the left and/or the right of the display 402, and/or the like. The display information module 204 may then determine the portion of the external display 402 that corresponds to the position of the mobile device 102b (e.g., based on images captured of the external display 402 or based on graphical information sent from the computing device 102a to the mobile device 102b and presented in an AR environment, and/or the like).

Accordingly, the presentation module 206 presents the information 416 for the portion of the external display that is obscured by the mobile device 102b such that the mobile device 102b can be used as a webcam without obscuring portions of the external display 402 that are important or of interest to the user. Moreover, the mobile device 102b can be placed in the user's 412 direct line of sight to correct the disorienting effect of looking at a camera that is not in the user's direct line of sight.

Figure 5:
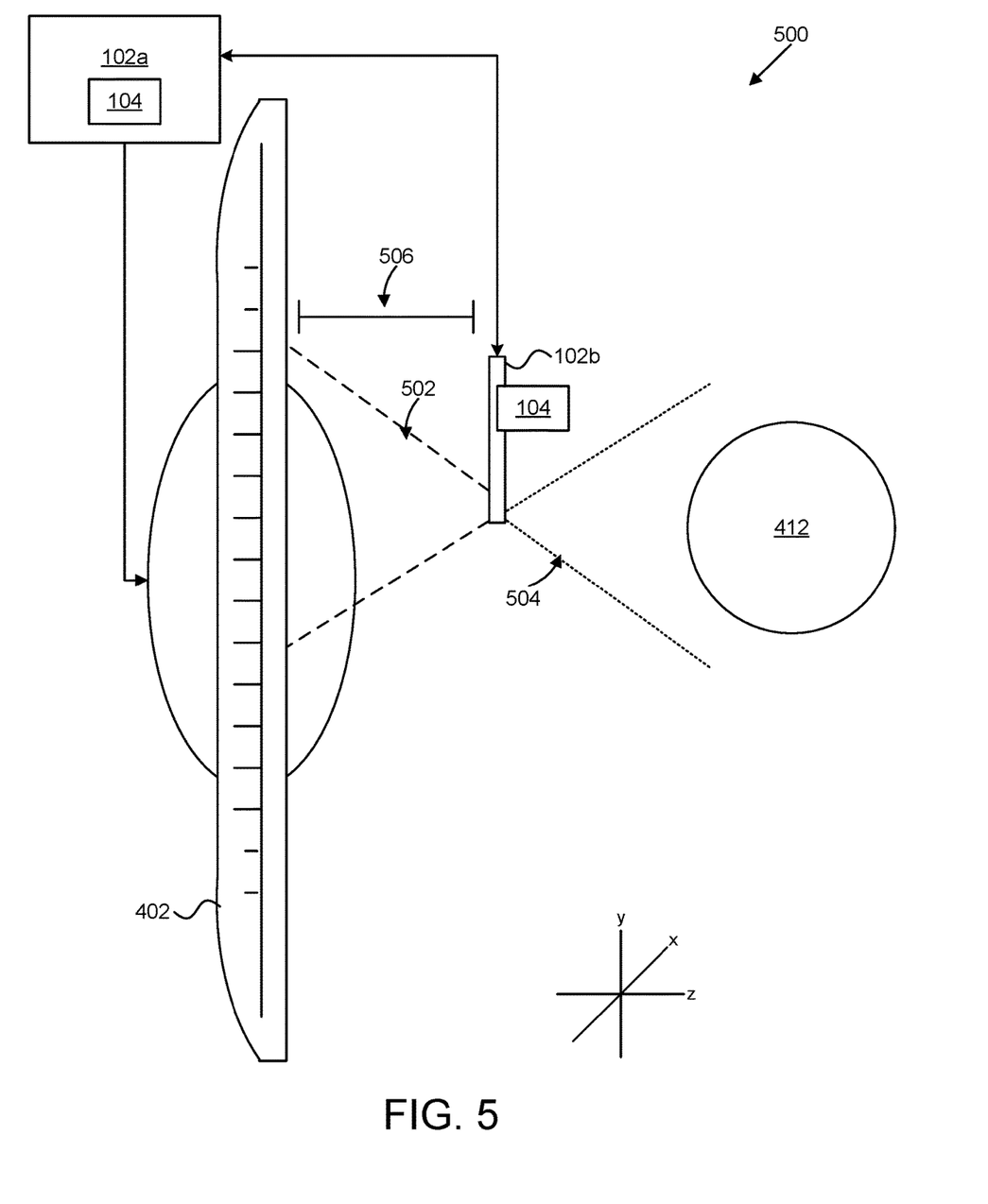
FIG. 5 is a schematic block diagram illustrating one embodiment of another example system for presenting a portion of a first display on a second display positioned relative to the first display.

FIG. 5 is a schematic block diagram illustrating one embodiment of another example system 500 for presenting a portion of a first display on a second display positioned relative to the first display. In one embodiment, the system 500 is substantially similar to the system 400 presented in FIG. 4. FIG. 5 depicts a top view of the system 500 to illustrate the position of the mobile device 102b in the three dimensional space between the user 412 and the external display 402.

As illustrated in FIG. 5, the field of view 502 of the rear-facing camera may be larger than the dimensions of the mobile device 102b, and therefore when images of the external display 402 are captured for presentation on the mobile device 102b, the captured images express more information than is needed. Accordingly, the scaling module 302 scales the images to only the portions of the display 402 that are actually obscured by the information handling device 102b using the position of the mobile device 102b relative to the external display 402 in the z-coordinate plane (e.g., the distance 506 between the external display 402 and the mobile device 102b).

Furthermore, FIG. 5 illustrates the field of view 504 of the front-facing webcam of the mobile device 102b, which is used to capture images/videos of the user 412 and transmit to the computing device 102a for presentation on the external display 402 and/or for transmission to a remote user. The display information module 204 may further use the images that the front-facing camera captures (and also sensor data) to determine the distance and/or angle of the user's location (e.g., head position, face, eye gaze, etc.) to determine and/or scale images of the external display that are captured using the rear-facing camera so that the images of the external display that are presented on the display of the information handling device 102b correspond to the viewing angle and distance of the user 412.

Figure 6:
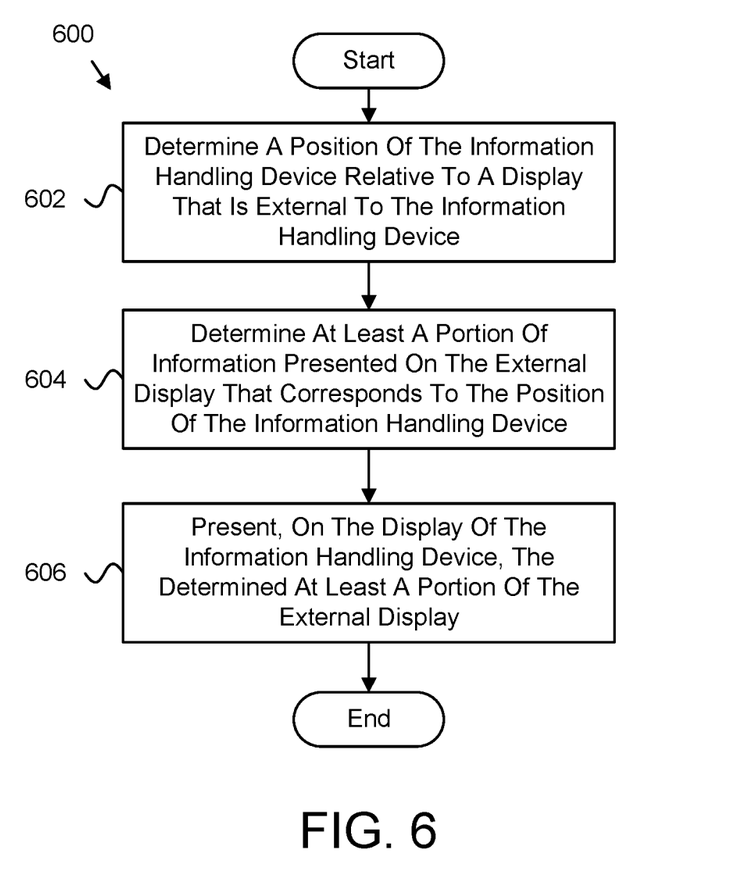
FIG. 6 is a schematic flow chart diagram illustrating one embodiment of a method for presenting a portion of a first display on a second display positioned relative to the first display.

FIG. 6 is a schematic flow chart diagram illustrating one embodiment of a method 600 for presenting a portion of a first display on a second display positioned relative to the first display. In one embodiment, the method 600 begins and determines 602 a position of an information handling device 102 relative to a display that is external to the information handling device 102. In some embodiments, the method 600 determines 604 at least a portion of information presented on the external display that corresponds to the position of the information handling device 102. In further embodiments, the method 600 presents 606, on the display of the information handling device 102, the determined at least a portion of the external display, and the method 600 ends. In certain embodiments, the position module 202, the display information module 204, and the presentation module 206 perform the various steps of the method 600.

Figure 7:
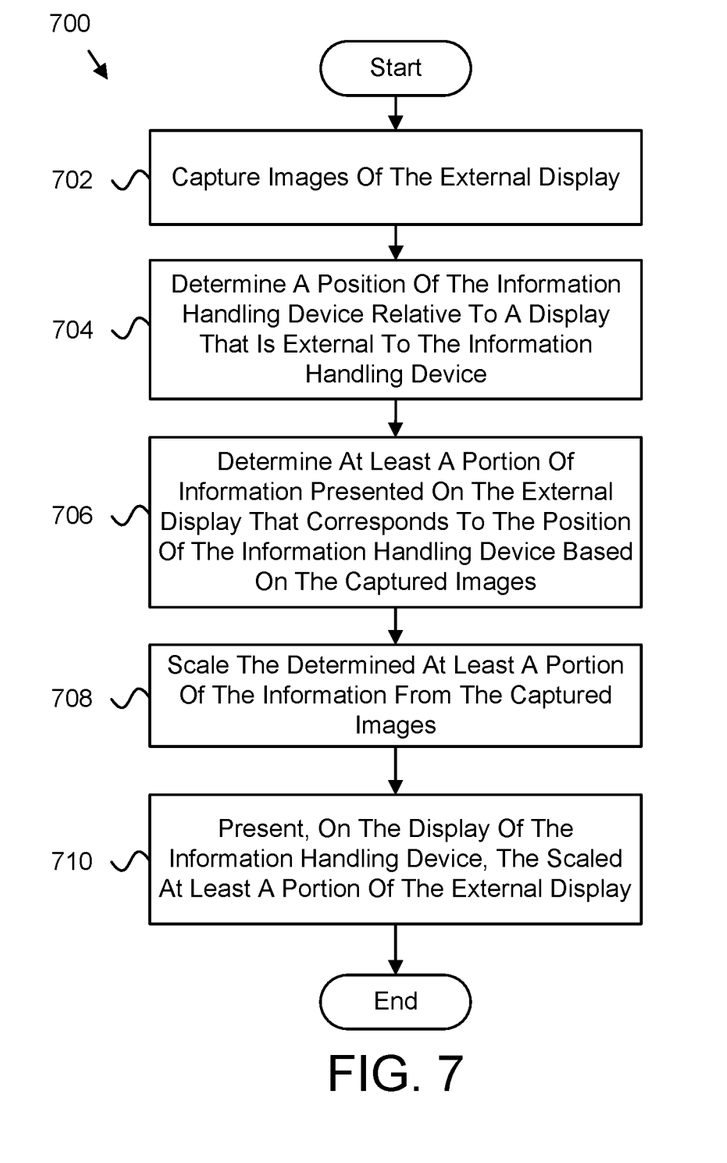
FIG. 7 is a schematic flow chart diagram illustrating one embodiment of another method for presenting a portion of a first display on a second display positioned relative to the first display.

FIG. 7 is a schematic flow chart diagram illustrating one embodiment of another method 700 for presenting a portion of a first display on a second display positioned relative to the first display. In one embodiment, the method 700 begins and captures 702 one or more images of an external display using a rear-facing camera of an information handling device 102. In further embodiments, the method 700 determines 704 a position of an information handling device 102 relative to a display that is external to the information handling device 102.

In various embodiments, the method 700 determines 706 at least a portion of information presented on the external display that corresponds to the position of the information handling device 102 based on the captured images. In further embodiments, the method 700 scales 708 the determined at least a portion of the information from the captured images and presents 710, on the display of the information handling device 102, the scaled at least a portion of the external display, and the method 700 ends. In certain embodiments, the position module 202, the display information module 204, the presentation module 206, and the scaling module 302 perform the various steps of the method 700.

Figure 8:
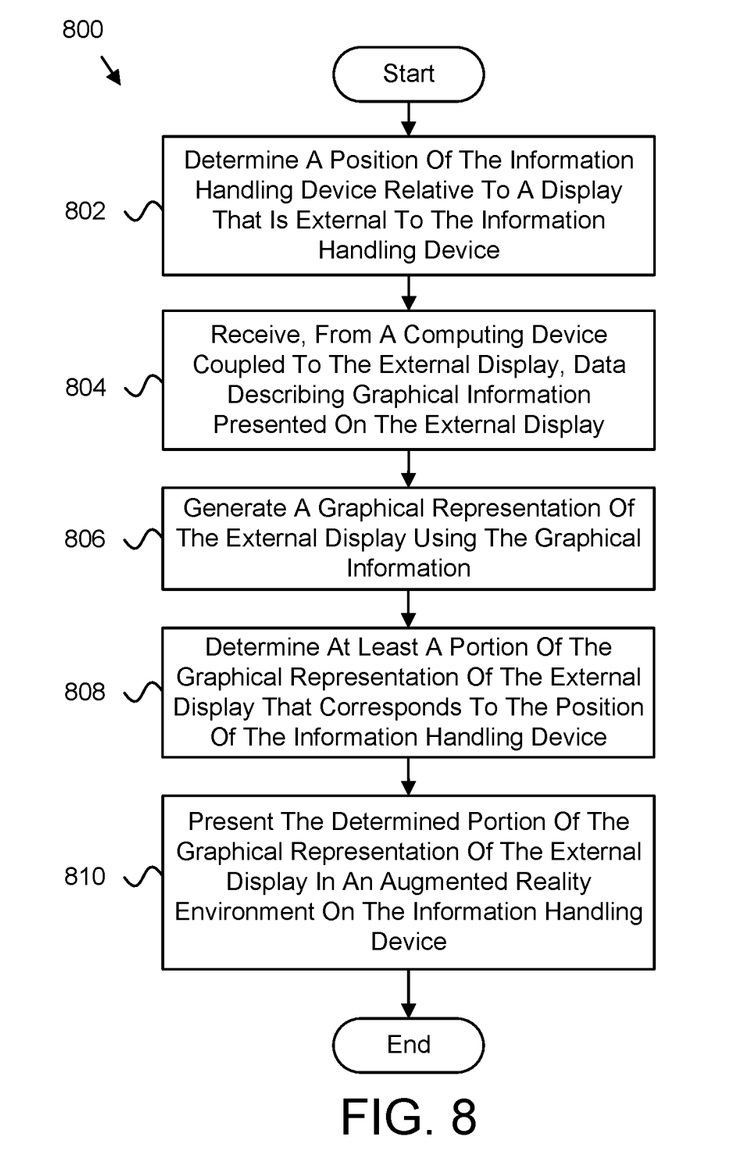
FIG. 8 is a schematic flow chart diagram illustrating one embodiment of yet another method for presenting a portion of a first display on a second display positioned relative to the first display.

FIG. 8 is a schematic flow chart diagram illustrating one embodiment of yet another method 800 for presenting a portion of a first display on a second display positioned relative to the first display. In one embodiment, the method 800 begins and determines 802 a position of an information handling device 102 relative to a display that is external to the information handling device 102.

In further embodiments, the method 800 receives 804, from a computing device coupled to the external display, data describing graphical information that is presented on the external display. The method 800, in some embodiments, generates 806 a graphical representation of the external display, on the information handling device 102, using the graphical information.

In one embodiment, the method 800 determines 808 at least a portion of the graphical representation of the external display that corresponds to the position of the information handling device 102 and presents 810 the determined portion of the graphical representation of the external display in an augmented reality or virtual reality environment on the information handling device 102, and the method 800 ends. In one embodiment, the position module 202, the display information module 204, the presentation module 206, and the AR module 304 perform the various steps of the method 800.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   an information handling device comprising:
      a processor;
      a display communicatively coupled to the processor;
      a first camera communicatively coupled to the processor; and
      a memory that stores code executable by the processor to:
         determine a position of the information handling device relative to a display that is external to the information handling device based on one or more images of the external display that are captured using the first camera of the information handling device, the first camera facing the external display;
         determine at least a portion of information presented on the external display that corresponds to the position of the information handling device; and
         present, on the display of the information handling device, the determined at least a portion of the external display.

2. The apparatus of claim 1, wherein the determined at least a portion of the information presented on the external display comprises information captured within a field of view of the camera.

3. The apparatus of claim 2, wherein the code is executable by the processor to scale the determined at least a portion of the information captured within the field of view of the camera based on the determined position of the information handling device relative to the external display and based on dimensions of the information handling device such that the scaled at least a portion of the information corresponds to a portion of the external display that is obscured by the information handling device.

4. The apparatus of claim 3, wherein the scaling of the determined at least a portion of the information captured within the field of view of the camera is further determined according to dimensions of the display of the information handling device and the bezel around the display of the information handling device.

5. The apparatus of claim 1, wherein the code is executable by the processor to receive, from a computing device coupled to the external display, data describing graphical information presented on the external display.

6. The apparatus of claim 5, wherein the code is executable by the processor to:
   generate a graphical representation of the external display using the graphical information; and
   present the graphical representation of the external display in an augmented reality environment,
   wherein the determined at least a portion of the external display that is presented on the display of the information handling device within the augmented reality environment comprises a portion of the graphical representation of the external display that is obscured by the information handling device.

7. The apparatus of claim 1, wherein the information handling device comprises one or more sensors communicatively coupled to the processor, the one or more sensors used to capture information for determining the position of the information handling device relative to the external display.

8. The apparatus of claim 7, wherein the code is executable by the processor to calibrate an initial position of the information handling device relative to the external display using the one or more sensors.

9. The apparatus of claim 1, wherein the information handling device further comprises a second camera communicatively coupled to the processor, the second camera facing away from the external display, wherein information that is captured using the second camera is transmitted to a computing device coupled to the external display.

10. The apparatus of claim 9, wherein the information presented on the external display comprises graphical information for a video conferencing application and the second camera of the information handling device is used as a webcam by the video conferencing application.

11. The apparatus of claim 1, wherein the code is executable by the processor to dynamically update the determined at least a portion of information presented on the external display that corresponds to the position of the information handling device in response to detecting a change in the position of the information handling device relative to the external display.

12. The apparatus of claim 11, wherein the determined at least a portion of information presented on the external display that corresponds to the position of the information handling device is updated in response to determining that the position of the information handling device is changed by a threshold amount.

13. A method comprising:
   determining, by use of a processor, a position of an information handling device relative to a display that is external to the information handling device based on one or more images of the external display that are captured using a first camera of the information handling device, the first camera facing the external display;

determining at least a portion of information presented on the external display that corresponds to the position of the information handling device; and presenting, on the display of the information handling device, the determined at least a portion of the external display.

14. The method of claim 13, wherein the determined at least a portion of the information presented on the external display comprises information captured within a field of view of the camera.

15. The method of claim 14, further comprising scaling the determined at least a portion of the information captured within the field of view of the camera based on the determined position of the information handling device relative to the external display and based on dimensions of the information handling device such that the scaled at least a portion of the information corresponds to a portion of the external display that is obscured by the information handling device.

16. The method of claim 13, further comprising receiving, from a computing device coupled to the external display, data describing graphical information presented on the external display.

17. The method of claim 16, further comprising:

generating a graphical representation of the external display using the graphical information; and presenting the graphical representation of the external display in an augmented reality environment, wherein the determined at least a portion of the external display that is presented on the display of the information handling device within the augmented reality environment comprises a portion of the graphical representation of the external display that is obscured by the information handling device.

18. The method of claim 13, further comprising calibrating an initial position of the information handling device relative to the external display using one or more sensors.

19. A program product comprising a non-transitory computer readable storage medium that stores code executable by a processor, the executable code comprising code to:

determine a position of an information handling device relative to a display that is external to the information handling device based on one or more images of the external display that are captured using the first camera of the information handling device, the first camera facing the external display;

determine at least a portion of information presented on the external display that corresponds to the position of the information handling device; and present, on the display of the information handling device, the determined at least a portion of the external display.

20. The apparatus of claim 8, wherein the code is executable by the processor to calibrate the initial position of the information handling device relative to the external display in response to the user executing a video call application.

* * * * *